US010142494B2

(12) United States Patent
Dabbiere et al.

(10) Patent No.: US 10,142,494 B2
(45) Date of Patent: Nov. 27, 2018

(54) ENFORCEMENT OF COMPLIANCE RULES

(71) Applicant: AirWatch LLC, Atlanta, GA (US)

(72) Inventors: Alan Dabbiere, McLean, VA (US); Erich Stuntebeck, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 502 days.

(21) Appl. No.: 14/498,280

(22) Filed: Sep. 26, 2014

(65) Prior Publication Data
US 2016/0094725 A1 Mar. 31, 2016

(51) Int. Cl.
H04M 15/00 (2006.01)
H04M 3/42 (2006.01)
H04W 4/16 (2009.01)
H04M 1/725 (2006.01)
H04W 12/06 (2009.01)
H04M 1/677 (2006.01)
H04W 12/08 (2009.01)
H04M 3/38 (2006.01)
H04L 29/06 (2006.01)

(52) U.S. Cl.
CPC ......... H04M 15/887 (2013.01); H04M 1/677 (2013.01); H04M 1/72572 (2013.01); H04M 1/72577 (2013.01); H04M 3/38 (2013.01); H04M 3/42102 (2013.01); H04W 4/16 (2013.01); H04W 12/06 (2013.01); H04W 12/08 (2013.01); H04L 63/083 (2013.01)

(58) Field of Classification Search
CPC .. H04M 15/887; H04M 3/38; H04M 3/42102; H04M 1/72572; H04M 1/72577; H04M 1/677; H04W 12/08; H04W 4/16; H04W 12/06; H04L 63/083
See application file for complete search history.

(56) References Cited

U.S. PATENT DOCUMENTS

2004/0208304 A1* 10/2004 Miller .................. H04M 1/663
                                                             379/210.02
2004/0209650 A1* 10/2004 Pearce ................. H04M 1/677
                                                             455/558
2013/0203397 A1*  8/2013 Vidal .................... H04W 12/06
                                                             455/418
2014/0145821 A1*  5/2014 Wang ................. G07C 9/00142
                                                             340/5.54

* cited by examiner

Primary Examiner — Marcos Torres
(74) Attorney, Agent, or Firm — Clayton, McKay & Bailey, PC

(57) ABSTRACT

Disclosed are various embodiments for enforcing restrictions or compliance rules specified by a dialer application or messaging application executed by a client device such as a smartphone. Such a device can be managed by an enterprise and assigned to a particular user. Restrictions can be based on a location of the client device, a network to which the client device is communicating, or other environmental variables.

18 Claims, 10 Drawing Sheets

ENFORCEMENT OF COMPLIANCE RULES

BACKGROUND

Policies with respect to making calls from mobile devices may be employed for various reasons. For example, a user exceeding an allotted number of minutes may incur significant overage charges. As another example, a user making calls while in a roaming territory may incur significant roaming charges. In an enterprise environment, these charges may result in a significant cost to the enterprise. Device administrators may wish to discourage or limit the ability of certain users to make calls for other reasons as well based upon other policies with respect to an enterprise and/or a user's preferences.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
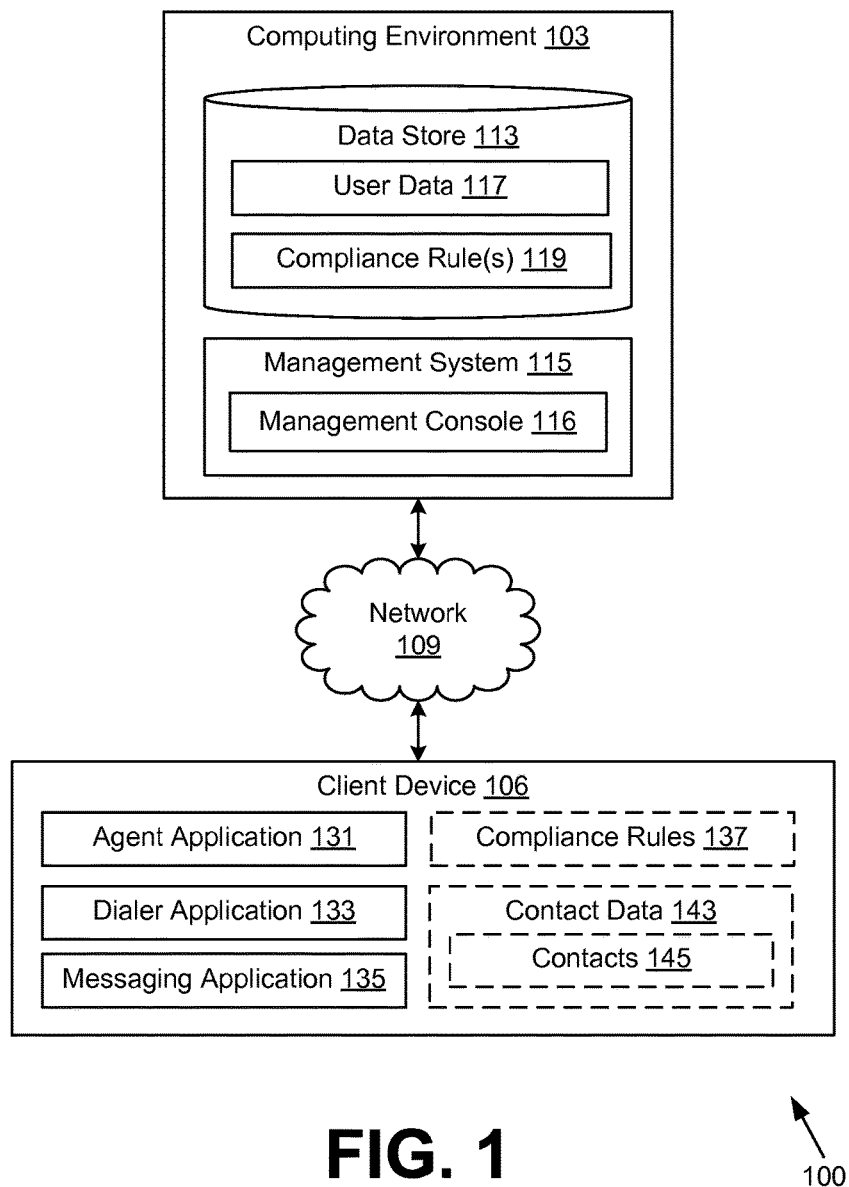
FIG. 1 is a drawing of a networked environment according to various embodiments of the present disclosure.

Users in an enterprise environment can be provided with a computing device, such as a smartphone, tablet device, a general purpose computing device, or other computing device. Device administrators may wish to impose certain restrictions, limitations and/or policies on the use of such a computing device for various reasons. For example, such a computing device may be capable of allowing actions to be taken that incur costs to the user or enterprise, such as the placing or receiving of calls, sending or receiving short message service (SMS) messages, or usage of a data allowance by applications and services executed by the computing device. Additionally, the computing device may be used by a user for business reasons associated with an employer providing and potentially paying or sharing the costs associated with usage of the device. The computing device may also be used by a user for personal reasons as well. Accordingly, a device administrator may desire to impose restrictions on the use of the computing device with respect to the various types of uses of the computing device.

As one example, a user may be traveling abroad for business or personal reasons, and may use a computing device (e.g., initiate and/or make calls, initiate and/or send SMS message, etc.) in various ways that may cause significant usage charges to accrue. Accordingly, a device administrator may wish to alert the user to this fact and require the user to confirm that he or she is incurring the usage for business reasons rather than for personal use and require that a password and/or billing code be entered by the user before placing the call. Continuing this example, if the usage of the device is for personal use, an administrator may wish to have the charges associated with that usage of the device be paid by the user rather than by the enterprise.

As yet another example, a user may wish to initiate a call for personal reasons during business hours. A device administrator may wish to alert the user to this fact and require the user to confirm that he or she is placing a call for personal reasons during business hours. Accordingly, embodiments of the present disclosure can facilitate restrictions or prohibitions to be placed on certain usage of a computing device based on a location, a time of day, whether the device is in a roaming mode, whether the usage will result in a charge or cost to the enterprise or user, or in order to comply with any type of compliance policy or compliance rule that can be specified by the administrator.

Embodiments of the disclosure operate by enforcing restrictions by way of a dialer application, a messaging application, or any other application executed by the computing device in which logic can be embedded that can analyze various compliance rules with respect to usage of the device (e.g., a management agent communicatively coupled to and/or embedded within the dialer application or the messaging application). Such an application can generate or initiate user interface elements that provide information with respect to a compliance rule that may apply to an attempt to initiate communication or other usage of the computing device. Such an application may also require a user to input information in order to complete an action with respect to a particular usage of the device.

For example, in order to complete an international call, a dialer application according to embodiments of the disclosure may generate user interface elements that require a user to enter a password or submit a confirmation that the user consents or acknowledges that a particular action is associated with a particular restriction. As one example, a user may be required to enter a personal identification number (PIN) to confirm that they wish to initiate an international call or any type of call when the computing device is in a roaming mode. As another example, the user may be presented with information in a user interface regarding a compliance policy of an enterprise stating that a particular call that may incur an additional charge can only be made for business purposes. Such a user interface may then require user confirmation or acknowledgement before initiating such a call. Other examples and variations are discussed in further detail herein. In the following discussion, a general description of the system and its components is provided, followed by a discussion of the operation of the same.

With reference to FIG. 1, shown is a networked environment 100 according to various embodiments. The networked environment 100 includes a computing environment 103 and a client device 106, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ a plurality of computing devices that may be arranged, for example, in one or more server banks, computer banks, or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various applications and/or other functionality may be executed in the computing environment 103 according to various embodiments. Also, various data is stored in a data store 113 that is accessible to the computing environment 103. The data store 113 may be representative of a plurality of data stores 113 as can be appreciated. The data stored in the data store 113, for example, is associated with the operation of the various applications and/or functional entities described below.

The components executed on the computing environment 103, for example, include a management system 115, management console 116, and other applications, services, processes, systems, engines, or functionality not discussed in detail herein. The management system 115 may be executed to manage and/or oversee the operation of multiple client devices 106. For example, an employer may operate the management system 115 to ensure that the client devices 106 of its employees are operating in compliance with various compliance rules. By ensuring that the client devices 106 of its employees are operated in compliance with the compliance rules, the employer may control and protect access to various data. The management system 115 may also facilitate access to email, calendar data, contact information, documents, or other enterprise data to which an enterprise may wish to provide access by users via client devices 106.

In one embodiment, the management system 115 may provide a management console 116 and/or other components. The management console 116 is executed to facilitate administration and/or management of client devices 106 that are associated with users accessing enterprise resources, such as mailbox data, calendar data, contact data, and/or user documents. In some embodiments, the management console 116 can provide a user interface accessible by an administrator through which the administrator may enroll, activate, remove, deactivate, or otherwise manage devices that are employed to access resources via an application or service provided by the computing environment 103. Such a user interface can also allow an administrator to define compliance rules with respect to usage of client devices 106 that are assigned to various users of an enterprise.

In some embodiments, the management console 116 may also determine compliance of client devices 106 associated with a particular user with compliance rules 119 in response to a request received from an application executed by a client device 106. The computing environment 103 may also execute other applications to facilitate interactions with a client device 106, such as an application distribution service that distributes applications and/or updates to applications to the client device 106, a mail server that provides email services and/or functionality, a document storage application that provides remote document storage capability for users of an enterprise, or other applications or services that an enterprise may deploy to provide services for its users. Description of such applications or services is not necessary for a complete understanding of embodiments of the disclosure.

The data stored in the data store 113 includes, for example, user data 117, compliance rules 119, and potentially other data. The user data 117 can include data associated with a user account, such as user profile information. User profile information can include information about a user's role within an organization, an office address or location, home address or location, permissions, and/or privileges with respect to usage of an enterprise device. For example, certain users in an enterprise may be classified differently from other users. A user to may travel extensively for business may be granted certain privileges with respect to usage of a device managed by the enterprise. Such a user may be granted additional minutes, roaming permissions, international calling or data permissions, or other allowances when compared to another user of the enterprise who is stationed at a particular location and does not travel extensively for business. For example, users who may be designated as company executives may similarly be granted additional usage allowances when compared to entry-level employees whose devices are managed by the enterprise.

User data 117 can also include access settings, such as authentication credentials, delegation settings (e.g., information about other users who may be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multi-factor authentication settings, and other data related to a user account as can be appreciated. User data 117 can also include other forms of data associated with users of an enterprise's computing resources that are not shown, such as a user's mailbox data, calendar data, contact data, and information about the various devices, such as device identifiers, that are assigned to the user and managed in some form by the management console 116. For example, mailbox data includes data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user.

Calendar data can include, for example, appointments, reminders, tasks and/or other data that can be associated with a timestamp or date stamp. Calendar data can include appointments that are associated with a particular location and/or user. For example, an appointment can be linked with a particular location, meeting room, building, address, or other location. An appointment can also be linked with another user who is internal or external to an organization or domain of the user as well as with text and/or attachments. Calendar data can also include tasks, reminders, or other types of data that can be associated with a time and/or place and placed on a calendar.

Contact data can include personal information manager (PIM) or address book information related to contacts of a particular user such as internal or external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. It should be appreciated that a client device 106 of a user may also be synchronized with various other forms of data other than the types of data that are discussed above and that the above examples are discussed merely for illustrative and explanatory purposes.

Compliance rules 119 can be stored on the data store 113 and/or on the client device 106 and can represent enterprise rules or requirements with which a user and/or a client device 106 must or should comply. For example, a compliance rule 119 can specify that a client device 106, in order to access user data 117, must execute a particular version of a mail client. As another example, a compliance rule 119 may specify that in order to initiate a call that causes a charge to be incurred, the user must enter a password, a PIN code, solve a Completely Automated Public Turing test to tell Computers and Humans Apart (CAPTCHA), or submit a confirmation that they acknowledge or agree to the charge in order to complete the call.

A compliance rule 119 may also specify that a user of a client device 106 may only initiate or receive calls for business reasons during certain hours of a day, a week, or a year in order comply with labor regulations. For example, if a worker, depending on a labor category, may only be authorized by an enterprise to work during certain hours in a day or on certain days, a compliance rule 119 may specify that they are unauthorized to initiate calls to contacts designated as business contacts or enterprise contacts outside of these hours. Conversely, a compliance rule 119 may specify that a particular user is not authorized to make personal calls during certain hours of a day or days of a week. Accordingly, the compliance rule 119 may specify that certain contacts or a group of contacts as authorized "work" or business contacts and another set of contacts stored on a client device 106 as "personal" contacts in order to enforce such a compliance rule(s) 119.

Additionally, certain compliance rules 119 may be enforced depending upon the location of the client device 106. For example, certain compliance rules 119 may be triggered when the location of the client device 106 is detected to be within or outside of a certain geographic area, or when the client device 106 is connected to a particular network 109. In such a scenario, a compliance rule 119 may specify restrictions on a user's ability to initiate communication via a client device 106 with contacts or contact identifiers, such as phone numbers that are associated with a contact saved on the phone or one that is manually inputted by a user. For example, if a user is traveling in another country, a compliance rule 119 may specify that attempts to initiate or receive a call and/or send or receive an SMS message are disallowed or that they are only allowed if the user confirms and acknowledges that the communication will cause a charge to be incurred. As another example, if client device 106 is determined to be within an unauthorized geographic area or location, a compliance rule 119 may specify that attempts to initiate or receive a call and/or send or receive an SMS message are disallowed.

Accordingly, in this sense, a compliance rule 119 can specify a condition and a subsequent action to be taken or a restriction to be imposed in response to the condition being met. For example, a compliance rule 119 can specify that if a particular condition is met with respect to a location or other state of a client device 106, an identity of a user, is met, then a particular action should be taken or a particular restriction should be imposed on a user's ability to initiate communication with a contact, a phone number, or other form of contact identifier using the client device 106.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute various applications, such as an agent application 131. The agent application 131 can be executed by the client device 106 upon startup of the client device 106. The agent application 131 can also be executed as a background process by the client device 106. The agent application 131 can be installed by a user and/or device administrator and facilitate access to user data 117 by a user of the client device 106. For example, the agent application 131 can be executed by a user to facilitate provisioning of a device and/or configuration of software to facilitate access to user data 117 and/or other enterprise resources. The agent application 131 may be communicatively coupled to and/or embedded within the dialer application 133 or the messaging application 135 such that the agent application 131 may control use of the dialer application 133 or messaging application 135, respectively (e.g., control their use in accordance with compliance rules 137).

The dialer application 133 may be executed to facilitate placing and/or receiving of calls to various contacts that may be stored on the client device 106 or other phone numbers. The dialer application 133 can be launched by a user of the client device 106 in order to initiate a call to the user. For example, the dialer application 133 can be interoperable with telephony capabilities of an operating system associated with the client device 106 to facilitate a user input of a phone number and/or a user selection of a phone number and then initiate a call via the telephony capabilities of the client device 106. Such telephony capabilities may allow for the placing of voice calls via a wireless carrier through which the client device 106 can communicate. Calls that are initiated via the dialer application 133 can be tracked by a wireless carrier and billed to a user or enterprise. In some embodiments, a user account or an enterprise account associated with the wireless carrier may be allotted a certain number of calling minutes during a billing period, and these calling minutes may also be classified as "peak" or "off-peak" minutes depending upon a time of day or a day of the week. Accordingly, calls initiated via the client device 106 through the dialer application 133 may be charged to such an account depending upon properties of the contact identifier (e.g., local number, long distance number, international number, voice over IP (VoIP) identifier), properties of the time of day, as well as properties of an allotment of calling minutes assigned to the user (e.g., whether overage charges are incurred, etc.).

The messaging application 135 is executed to facilitate sending and/or receiving of SMS messages or other messages from other messaging formats to various contacts that may be stored on the client device 106 or other phone numbers. The messaging application 135 can be launched by a user of the client device 106 in order to send an SMS message to another client device 106. For example, the messaging application 135 can be interoperable with telephony or messaging capabilities of an operating system associated with the client device 106 to facilitate a user input of a phone number and/or a user selection of a contact identifier. Then, the messaging application 135 can facilitate messaging via the telephony or messaging capabilities of the client device 106. Such capabilities may allow for messaging via a wireless carrier through which the client device 106 can communicate. Messages that are sent or received via the messaging application 135 can be tracked by a wireless carrier and billed to a user or enterprise. In some embodiments, a user account or an enterprise account associated with the wireless carrier may be allotted a certain number of messages during a billing period, and these calling minutes may also be classified as "peak" or "off-peak" minutes, depending upon a time of day or a day of the week. Accordingly, messages exchanged via the client device 106 through the messaging application 135 may be charged to such an account depending upon properties of the contact identifier (e.g., local number, long distance number, international number, voice over IP (VoIP) identifier), properties of the time of day, as well as properties of an allotment of calling minutes assigned to the user (e.g., whether overage charges are incurred, etc.) Compliance rules 137 can also be stored on a client device 106. As described above, compliance rules 119 can specify various requirements or rules that should be followed in order for a user to access user data 117 via the client device 106. Accordingly, the agent application 131 can obtain compliance rules 119 from the computing environment 103 and store them as compliance rules 137 on the client device 106. Additionally, compliance rules 119 may also specify rules or restrictions with respect to restrictions that should be enforced and imposed on an attempt to initiate a call via the dialer application 133 or send a message via the messaging application 135. As such, in some embodiments, the dialer application 133 and/or messaging application 135 can enforce the compliance rules 137 on the client device 106 on behalf of the remote mail server 115 with respect to calling and/or messaging capabilities of the client device 106.

Contact data 143 can also be stored on the client device 106. In some embodiments, contact data 143 can be obtained from the computing environment 103 by the agent application 131 or other application or service executed by the client device 106. In some embodiments, contact data 143 and can be synchronized with user data 117 corresponding to a user associated with the client device 106. Contact data 143 can comprise one or more contacts with which a user can initiate communication with the dialer application 133 and/or the messaging application 135. Accordingly, a particular contact may be associated with multiple contact identifiers, such as various phone numbers, email addresses, VoIP identifiers, or other contact identifiers with which the dialer application 133, messaging application 135, or other application can initiate communication with a contact.

Contact data 143 can also be stored on the client device 106. In some embodiments, contact data 143 can be obtained from the computing environment 103 by the agent application 131 or other application or service executed by the client device 106. In some embodiments, contact data 143 and can be synchronized with user data 117 corresponding to a user associated with the client device 106. Contact data 143 can comprise one or more contacts 145 with which a user can initiate communication with the dialer application 133 and/or the messaging application 135. Accordingly, a particular contact may be associated with multiple contact identifiers, such as various phone numbers, email addresses, VoIP identifiers, or other contact identifiers with which the dialer application 133, messaging application 135 or other application can initiate communication with a contact 145.

Next, a general description of the operation of the various components of the networked environment 100 is provided. To begin, as noted above, compliance rules 119 can be created by an administrator and specify restrictions that should be imposed on users with respect to calling and/or messaging capabilities of a client device 106 that is managed by the enterprise. A compliance rule 119 can identify a particular environmental variable associated with a client device 106 and specify a particular restriction that should be imposed or an action that should be taken with respect to calling or messaging capabilities. In this regard, a dialer application 133 and/or messaging application 135 can enforce compliance rules 119 that are stored on the client device 106 as compliance rules 137 on behalf of an administrator.

For example, if a client device 106 is in a domestic roaming mode or an international roaming mode, a compliance rule 119 can specify that, in response to detection of such an environmental variable, that restrictions upon calling and/or messaging capabilities should be imposed. For example, such a restriction can comprise a requirement that a user enter a password via the dialer application 133 or messaging application 135 to complete a call to any contact while in a roaming mode. Therefore, in response to a request to initiate a call or send a message to a particular contact, the dialer application 133 or messaging application 135 can render a user interface element requiring the user to enter a password, PIN code, or a confirmation that the user wishes to complete the call despite the fact that the client device 106 is in a roaming mode. As another example, the restriction can comprise a requirement that a user enter a password via the dialer application 133 or messaging application 135 to initiate communication to certain contacts, such as those that are designated as business contacts, but deny a request to initiate communication with other contacts, such as those that are identified as personal contacts while in a roaming mode.

Figure 2:
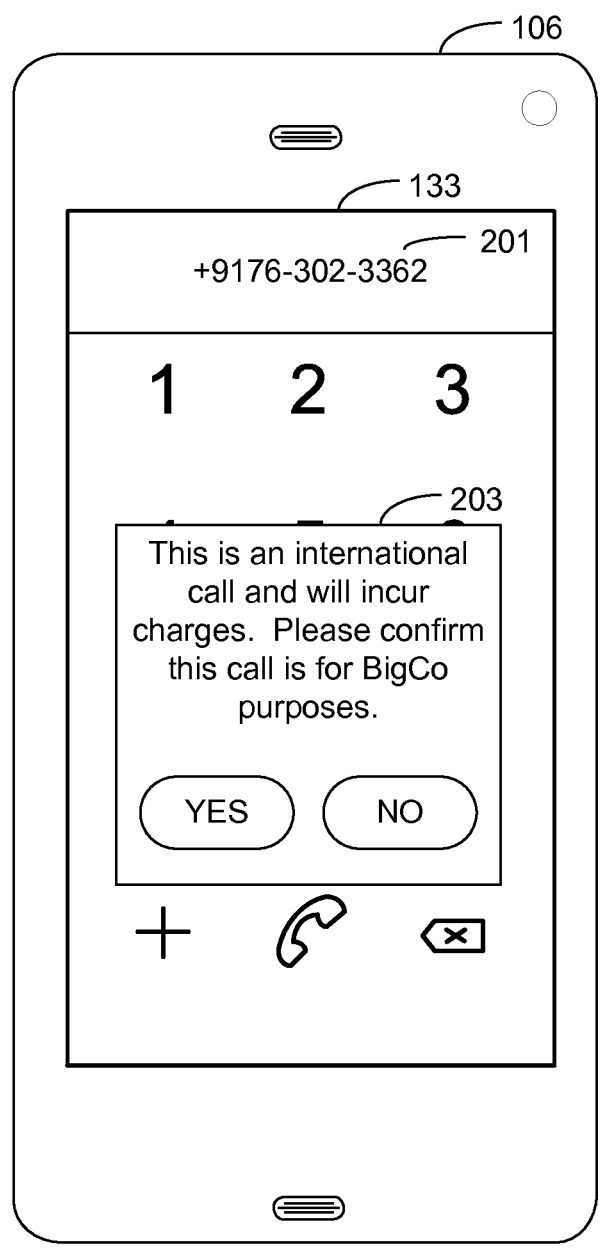
FIG. 2 is a pictorial diagram of an example user interface rendered by a client device in the networked environment of FIG. 1 according to various embodiments of the present disclosure.

Additional examples and variations of compliance rules 137 that can be enforced by a dialer application 133 and/or messaging application 135 are discussed in the following discussion of FIGS. 2-9. Accordingly, referring next to FIG. 2, shown is an example user interface that can be rendered by a dialer application 133 executed by a client device 106 according to various embodiments of the present disclosure. The user interface rendered by the dialer application 133 can, in some embodiments, provider a dial pad, a contact list, missed calls, placed calls, voicemails, etc., FIGS. 2-6 illustrate and discuss examples of enforcement of compliance rules 137 that are stored on the client device 106 and obtained from the computing environment 103 (FIG. 1) by a dialer application 133 according to various embodiments of the disclosure. It should be appreciated that embodiments of the disclosure may also include a messaging application 135 enforcing compliance rules 137 by imposing restrictions on requests to initiate communication based on environmental variables associated with a client device 106 and that the depicted non-examples of a dialer application 133 are shown merely for the sake of illustration.

In the example of FIG. 2, a user, via a user interface generated by the dialer application 133, has initiated a request to initiate communication with a particular contact identifier 201. In the example of FIG. 2, the contact identifier 201 comprises a phone number dialed by the user. In some scenarios, a contact identifier 201 can comprise a phone number selected via an application through which contacts can be browsed or otherwise selected. Accordingly, in the example of FIG. 2, the dialer application 133 can, in response to receiving a request to initiate a call to the depicted phone number, determine whether a compliance rule 137 stored on the phone specifies a policy with respect to the request. In the example of FIG. 2, a compliance rule 137 can specify, in response to detecting that the user is attempting to call an international number or any other number for which a charge will be assessed by a carrier, that a user interface element 203 that requests confirmation or acknowledgement from the user in order to initiate the call should be rendered. In the scenario shown in FIG. 2, the user interface element 203 requires the user to confirm that the call being initiated is for business purposes.

In this sense, detection of a potential call to an international number or any number for which a charge may be assessed constitutes detection of an environmental variable with respect to the client device 106. Accordingly, the dialer application 133 can also detect other environmental variables that may affect whether a user account or an enterprise account associated with the client device 106 may be assessed a charge. For example, the dialer application 133 can obtain a geographic location of the client device 106 via a positioning system of the client device 106 or a roaming state of the client device in order to determine whether a call initiated by the user would cause a charge to be associated with the call.

The dialer application 133 can determine whether a charge would be associated with the call based on other parameters as well. For example, a particular area code, country code, any other prefix, suffix or other number properties can be analyzed to determine whether a call being initiated by the user would result in an additional charge based upon a calling plan associated with the client device 106. In such a scenario, a particular compliance rule 137 may specify a particular restriction to be imposed on the attempt to initiate the call. Additionally, in some embodiments, the dialer application 133 can track whether the user is making calls for business purposes separately from personal calls and submit data regarding individual calls or aggregate calling data to the computing environment 103. In this way, a user may be assessed partial responsibility for a bill that is split with an enterprise based upon the user's actual calling or messaging usage.

Figure 3:
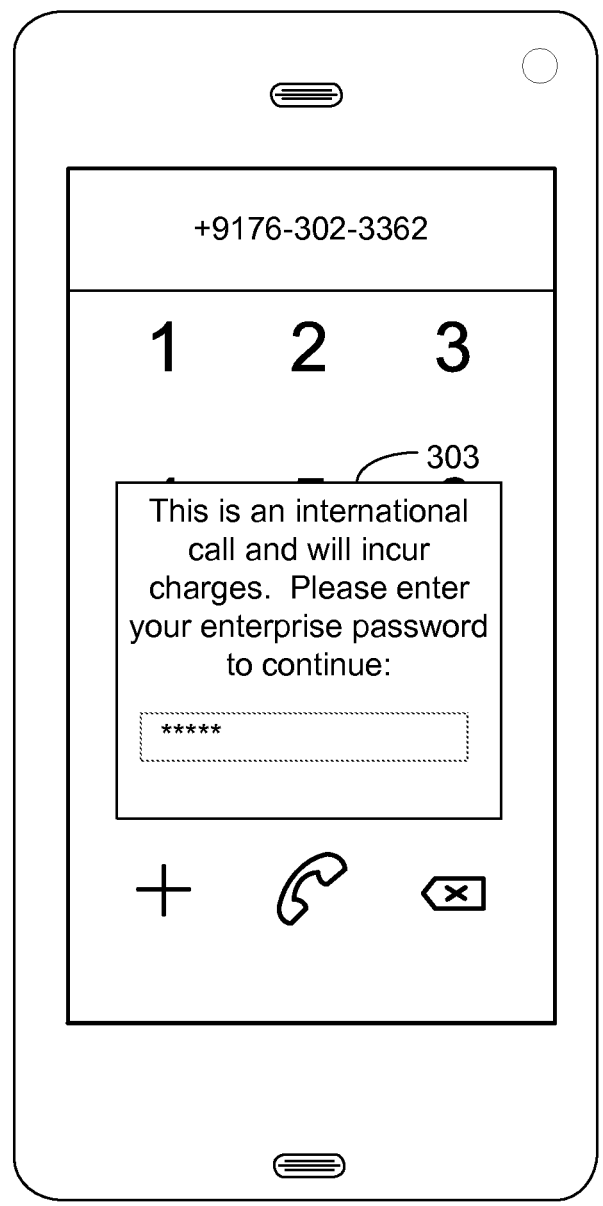
FIG. 3 is a pictorial diagram of an example user interface rendered by a client device in the networked environment of FIG. 1 according to various embodiments of the present disclosure.

Turning now to FIG. 3, shown is another scenario in which a user, via the dialer application 133, has attempted to initiate another call that may cause a charge to be incurred. Therefore, in response to detection of such an environmental variable, the dialer application 133 renders a user interface element 303 in which the user is prompted to input a password in order for the call to be completed. In the depicted scenario, the dialer application 133 may prompt the user to enter a password and employ a user authentication API in order to verify the user's enterprise password or any other form of password authentication.

In some embodiments, the dialer application 133 may also render a user interface element 303 that requires the user to solve a CAPTCHA, a puzzle, or answer any other question in order for the call to be initiated by the dialer application 133. In some embodiments, an administrator may wish to impose a restriction or hurdle that a user is required to overcome in order to initiate a call that will incur a charge so that the user confirms his or her intention to complete such a call.

Figure 4:
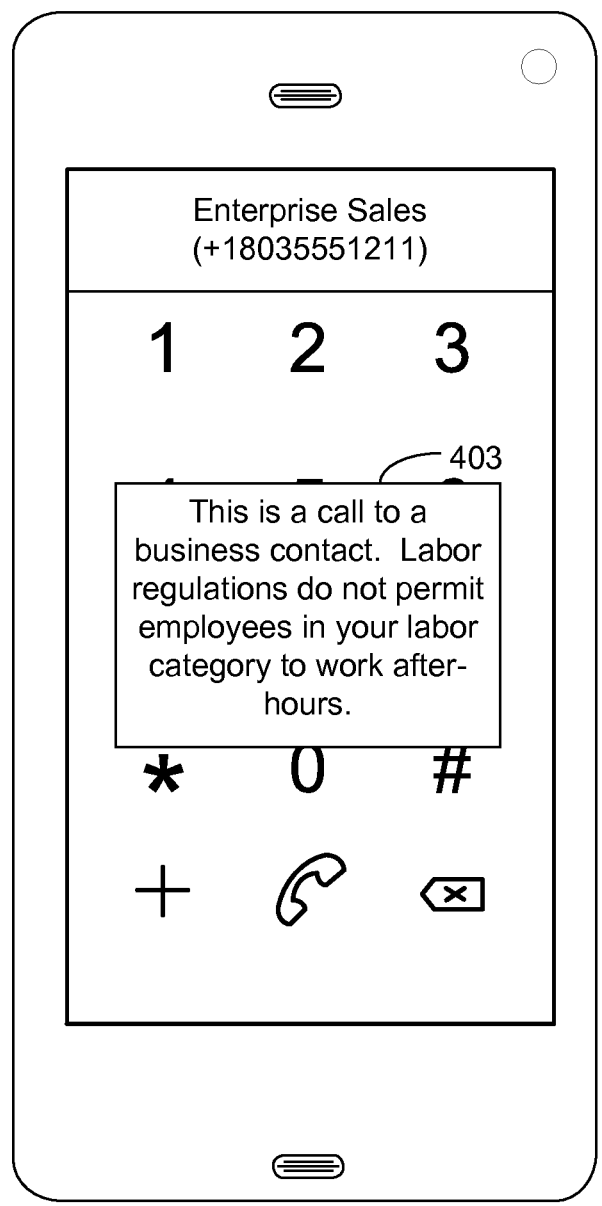
FIG. 4 is a pictorial diagram of an example user interface rendered by a client device in the networked environment of FIG. 1 according to various embodiments of the present disclosure.

Turning now to FIG. 4, shown is another scenario in which a user, via the dialer application 133, has attempted to initiate another call. In the example of FIG. 4, the dialer application 133 has detected an environmental variable such as the time of day or a day on which the user is attempting to initiate a call. In one scenario, a user associated with a client device 106 may be restricted from working during certain hours of the day or on particular days due to labor regulations, enterprise policies, or other reasons. Accordingly, the dialer application 133 can detect an attempt by the user to initiate a call to a contact that is designated as a business contact that is initiated outside of a particular authorized time window and refuse to complete the call. In this scenario, the dialer application 133 can render a user interface element 403 that includes information about why a request to initiate a call has been rejected. In contrast, the dialer application 133 can detect an attempt by the user to initiate a call to a contact that is designated as a business contact that is initiated within a particular authorized time window and complete the call.

A request to initiate a call or send a message can be disallowed in response to various environmental variables. For example, a compliance rule 137 can specify that a call should be disallowed if the user attempts to initiate a call to a personal contact during business hours and/or on a business day. Additionally, a compliance rule 137 may also specify that a call should be rejected if the user attempts to initiate a call that may cause a charge to be incurred, such as an international call or any other toll call. In some embodiments, the dialer application 133 can also render a user interface element seeking user confirmation or user authentication in response to detection of such a scenario. In other words, the dialer application 133 can generate a user interface that includes information about a particular compliance rule 137 that a call would violate and require the user to acknowledge the information before completing the call. In this way, an administrator can provide a user with the ability to initiate calls that violate one or more compliance rules 137 but in a way that informs the user of such violations prior to completing a requested call.

In some embodiments, the client device 106 can be equipped with software that facilitates a personal mode and a business mode of the client device 106. A personal mode can allow for one set of application installations, settings and other personalizations of the client device 106 while a business mode can allow for another set of application installations, settings and other personalizations. For example, a business mode may employ additional security and/or tracking of usage of the client device 106, while a personal mode may employ lesser security and/or tracking of usage of the client device 106.

In some embodiments, a compliance rule 119 may specify that certain actions should be taken in a business mode or a personal mode. For example, a compliance rule 119 may specify that calls to contacts that are designated as business contacts should be initiated while the client device 106 is in a business mode, while calls that are initiated to contacts that are designated as personal contacts should be initiated while the client device 106 is in a personal mode. Accordingly, in one embodiment, a dialer application 113 and/or messaging application 135 enforcing such a restriction can initiate or render a user interface requiring the user to select a different mode if such a communication is attempted in violation of a compliance rule 119.

Figure 5:
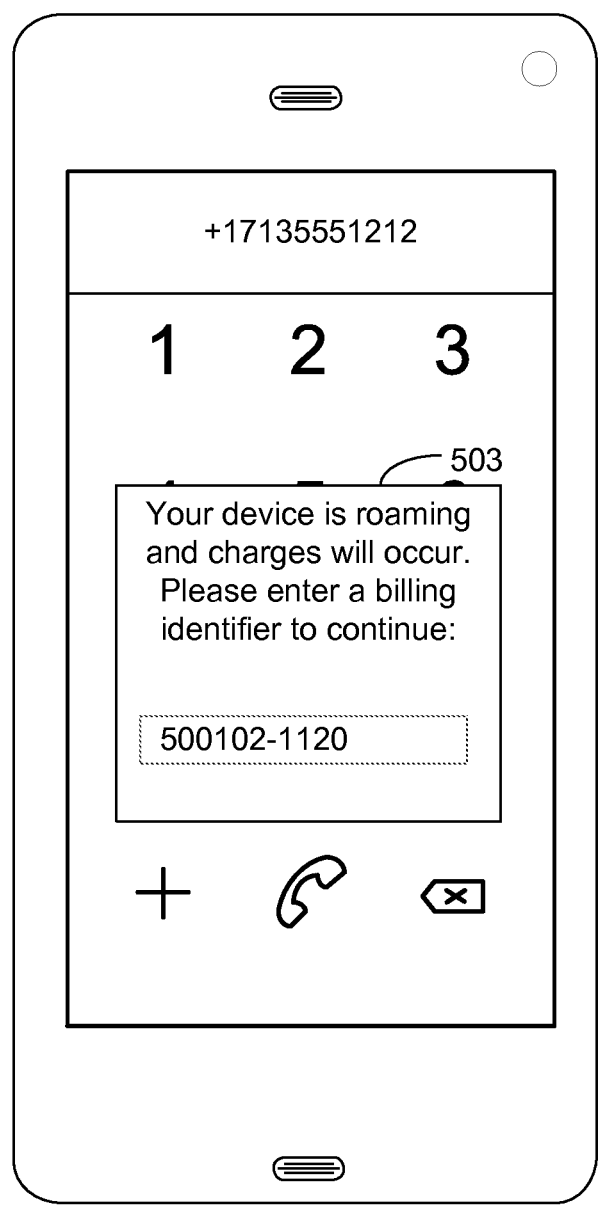
FIG. 5 is a pictorial diagram of an example user interface rendered by a client device in the networked environment of FIG. 1 according to various embodiments of the present disclosure.

Turning now to FIG. 5, shown is another scenario in which a user, via the dialer application 133, has initiated another attempt to initiate a call. In the example of FIG. 5, the dialer application 133 can detect via one or more environmental variables that a call would cause a charge to be incurred. In the scenario shown in FIG. 5, a compliance rule 137 can specify that a billing identifier or billing code should be entered in response to detecting that a call would incur a charge. Accordingly, the dialer application 133 can render a user interface element 503 that requests a billing identifier. Upon initiating or completion of the call, the billing identifier along with details regarding the call can be transmitted to the computing environment 103 and/or any other billing or tracking system.

Figure 6:
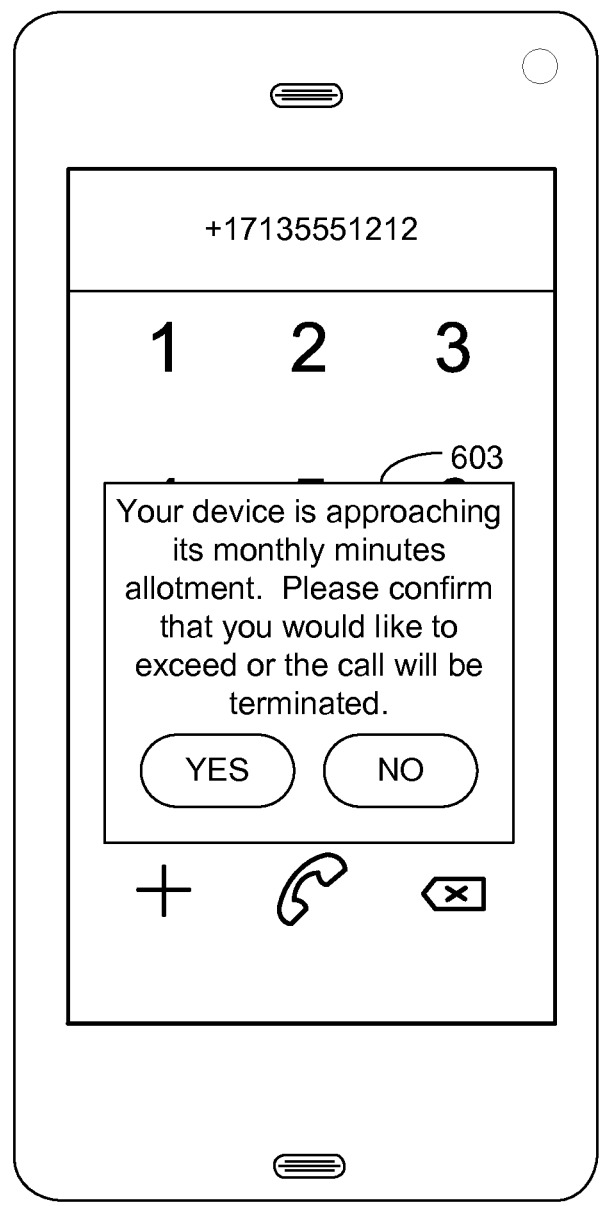
FIG. 6 is a pictorial diagram of an example user interface rendered by a client device in the networked environment of FIG. 1 according to various embodiments of the present disclosure.

Turning now to FIG. 6, shown is another scenario in which a user, via the dialer application 133, has initiated another attempt to initiate a call. In the example of FIG. 6, the dialer application 133 can also track a user's periodic usage and compare this usage with an allotment of calling minutes by a calling plan. In the scenario shown in FIG. 6, the dialer application 133 has detected that the periodic usage of the user has caused them to come within a pre-defined threshold percentage of a monthly calling minute allotment. Accordingly, a compliance rule 137 can specify that upon detection of such a condition, that the dialer application 133 can render a user interface element seeking user input before completing such a call. In the example of FIG. 6, the dialer application 133 renders a user interface element 603 that presents information as specified by a compliance rule 137 that then requires user acknowledgement.

Figure 7:
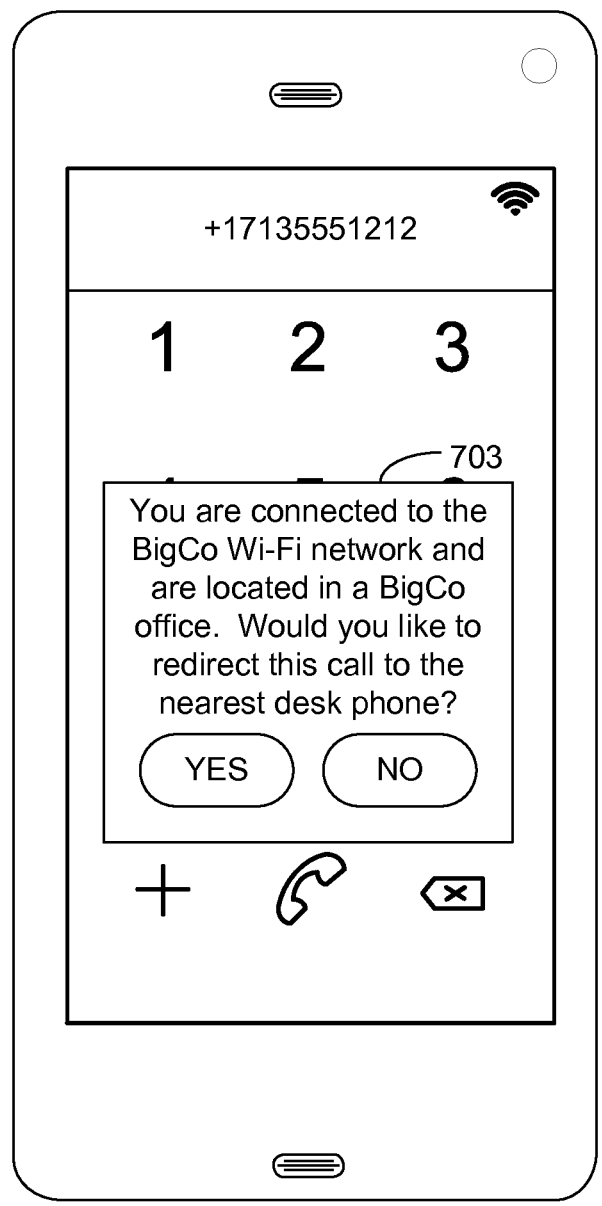
FIG. 7 is a pictorial diagram of an example user interface rendered by a client device in the networked environment of FIG. 1 according to various embodiments of the present disclosure.

Turning now to FIG. 7, shown is another scenario in which a user, via the dialer application 133, has initiated another attempt to initiate a call. In some embodiments, a compliance rule 137 can specify that a call should be rerouted or modified in response to detection of an environmental variable. In this scenario, an environmental variable can include a location of the client device 106 and/or a network to which the client device 106 is connected. For example, a compliance rule 137 can specify various restrictions that should be imposed in response to detection of such an environmental variable. In one scenario, the dialer application 133 can detect that the client device 106 is connected to a wireless network belonging to or associated with an enterprise. More specifically, the dialer application 133 may detect that the wireless network is associated with a particular floor and/or region of a floor within a building associated with the enterprise. In response to detecting such an environmental variable, the dialer application 133 can identify, via an API provided by an enterprise phone system or network, a nearest landline, and/or internet protocol (IP) phone within the particular building in the enterprise associated with the location of the client device 106.

The dialer application 133 can then generate a user interface element 703 containing a notification that a call that is being attempted can be redirected to the nearest desk phone via an API provided by the enterprise phone system. A compliance rule 137 can specify that redirection of a call to a desk phone is attempted only when the user attempts to initiate a call via the dialer application 133 that would result in a charge and/or the user exceeding or nearing a periodic calling minutes allotment. As another example, a compliance rule 137 can specify that the dialer application 133 analyze a contact selected by a user to which a call is being attempted to determine whether an alternative calling mechanism can be employed. For example, if a particular contact is associated with a traditional phone number as well as a VoIP contact identifier, the dialer application 133 initiate a call to the VoIP contact identifier if a call to the traditional phone number would result in a charge.

Figure 8:
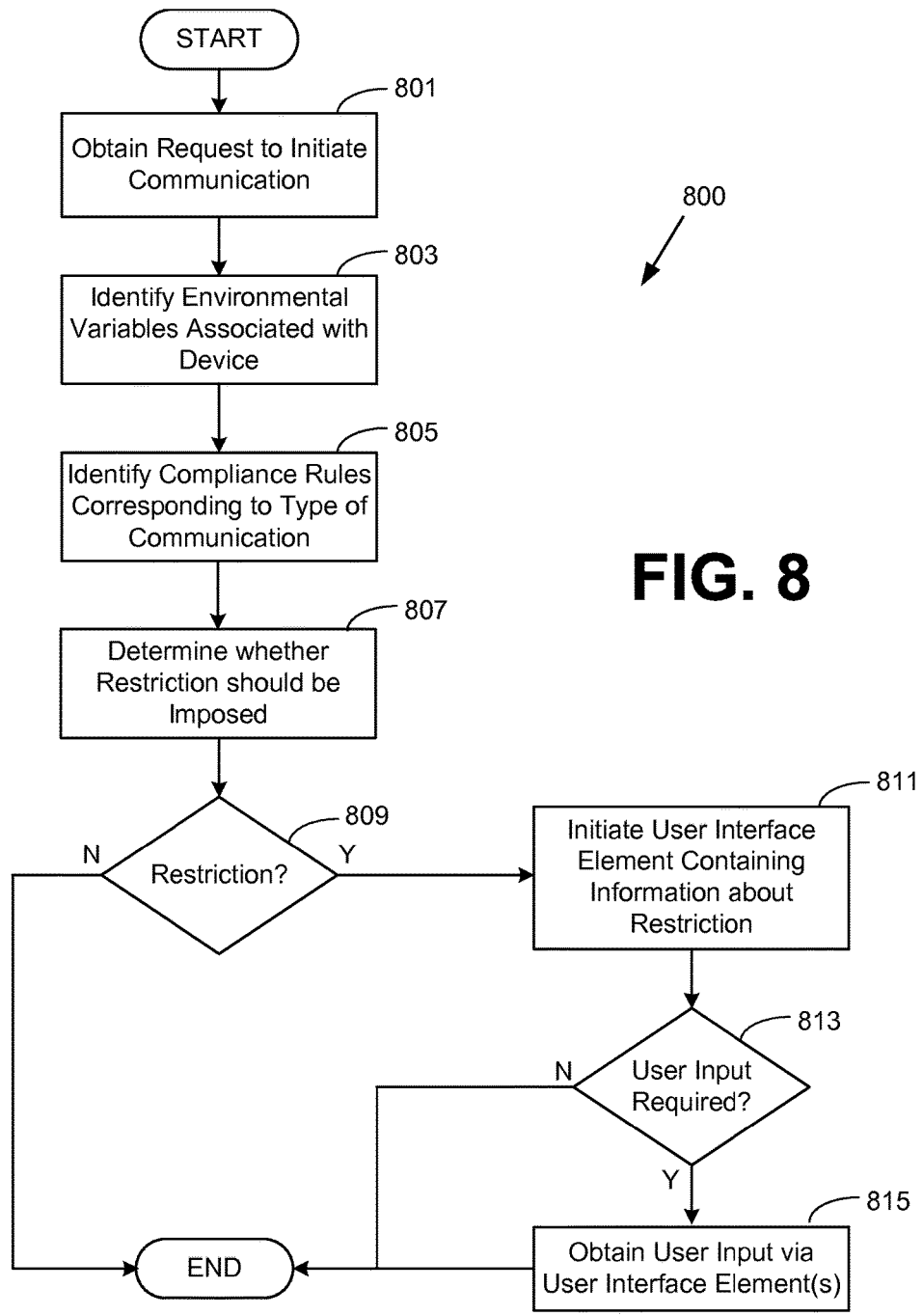
FIG. 8 is a flowchart illustrating one example of functionality implemented as portions of an application executed in a computing environment in the networked environment of FIG. 1 according to various embodiments of the present disclosure.

Referring next to FIG. 8, shown is a flowchart that provides one example of the operation of a portion of the management system 115, dialer application 133 and/or messaging application 135 according to various embodiments. It is understood that the flowchart of FIG. 8 provides merely an example of the many different types of functional arrangements that may be employed to implement the operation of the portion of the management system 115, dialer application 133 and/or messaging application 135 as described herein. As an alternative, the flowchart of FIG. 8 may be viewed as depicting an example of elements of a method 800 implemented in the client device 106 (FIG. 1) according to one or more embodiments. Additionally, it should be appreciated that the dialer application 133, messaging application 135, and/or other application executed by a client device 106 may enforce compliance rules 137 that specify restrictions that should be imposed on a user's attempt to initiate communication via the client device 106. In some embodiments, the management system 115 executed by the computing environment 103 may enforce compliance rules 137 that specify restrictions that should be imposed on a user's attempt to initiate communication via the client device 106

Beginning with box 801, the client device 106 or computing environment 103 can obtain a request to initiate communication. Such communication can comprise a phone call to a phone number, a VoIP identifier or any other contact identifier. The communication can also comprise an attempt to send a message to another phone number or messaging identifier. Next, at box 803, the client device 106 or computing environment 103 can determine various environmental variables that are specified by compliance rules 137 as relevant or necessary to obtain in order to enforce the compliance rules 137. These environmental variables can comprise a location of the client device 106, a roaming state or roaming indicator, a network with which the client device 106 is in communication, a time of day, day of the week, day of the year, whether the client device 106 is in a business mode or a personal mode, a periodic calling or messaging allotment, data allowance, etc.

At box 805, the client device 106 or computing environment 103 can identify compliance rules 137 that are associated with the communication attempted by the client device 106. At box 807, the client device 106 or computing environment 103 can determine whether the compliance rules 137 specify a restriction that should be imposed on the communication attempted based at least in part upon the characteristics of the communication attempt (e.g., phone number, contact identifier) as well as environmental variables that may be related to the communication attempt.

If the client device 106 or computing environment 103 determines whether a restriction should be imposed upon the communication attempt at box 809, then at box 811, the client device 106 or computing environment 103 can impose the restriction and render a user interface element providing information about the restriction. Such a user interface element may comprise an audible or visual alert to the user. At box 813, the client device 106 or computing environment 103 may require user input via a user interface element rendered by the client device 106. If no user input is required, the process shown in FIG. 8 can proceed to completion.

If user input is required, such as a user confirmation, acknowledgement, password input, PIN input, or other input, then at box 815, the client device 106 can obtain the user input via the user interface element rendered by the client device 106 in accordance with a specified restriction. A user input can also include a biometric authentication of the user (e.g., a fingerprint authentication), obtaining a particular user input pattern (e.g., a particular swipe pattern, a solution to a puzzle or game, etc.), or an input associated with or displayed by another device. For example, the compliance rule 119 may require the user to authenticate with another device, such as a radio frequency identification (RFID) reader, a near-field communication (NFC) reader, or another client device 106, etc. As another example, a compliance rule 119 may require that the user capture a representation of a particular barcode identifier or other visual password or authentication mechanism. Thereafter, the method 800 proceeds to completion. It should be understood that such restriction need not prevent the client device from satisfying the user's request to initiate communication. If a user confirmation, acknowledgement, etc., is properly obtained according to a particular compliance rule 119, then the restriction can be deemed to have been successfully imposed and the call may be completed as requested by the user.

Figure 9:
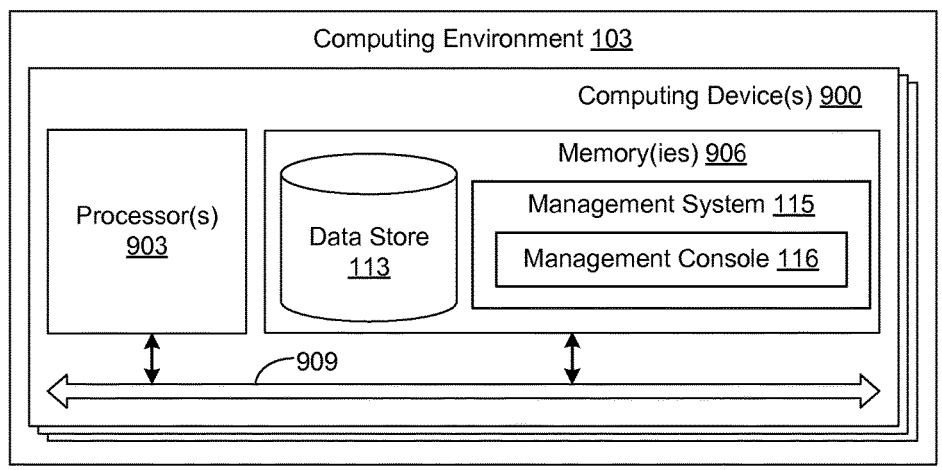
FIG. 9 is a schematic block diagram that provides one example illustration of a computing environment employed in the networked environment of FIG. 1 according to various embodiments of the present disclosure.
Figure 10:
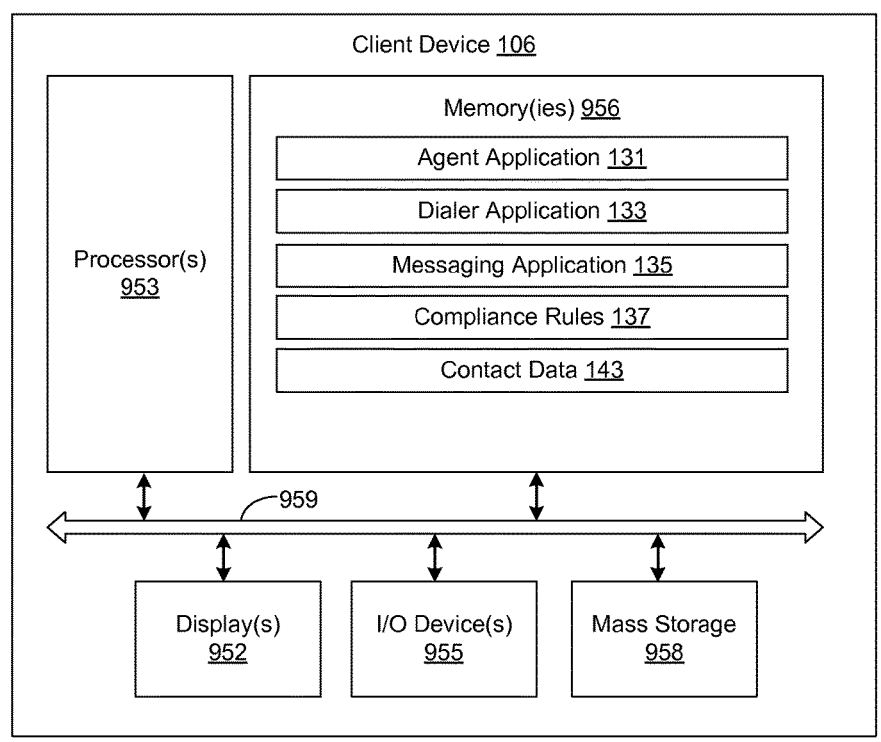
FIG. 10 is a schematic block diagram that provides one example illustration of a client device employed in the networked environment of FIG. 1 according to various embodiments of the present disclosure.

With reference to FIGS. 9-10, shown is a schematic block diagram of the computing environment 103 and client device 106 according to an embodiment of the present disclosure. The computing environment 103 includes one or more computing devices 900. Each computing device 900 and/or client device 106 includes at least one processor circuit, for example, having a processor 903, 953 and a memory 906, 956, both of which are coupled to a local interface 909, 509, respectively. As such, each computing device 900 may comprise, for example, at least one server computer or like device. A client device 106 may comprise a mobile device, smartphone, computing device or like device. The local interface 909, 509 may comprise, for example, a data bus with an accompanying address/control bus or other bus structure as can be appreciated.

Stored in the memory 906, 956 are both data and several components that are executable by the processor 903, 953. In particular, stored in the memory 906 and executable by the processor 903 are the remote mail server 115, and potentially other applications. Also stored in the memory 906 may be a data store 113 and other data. In addition, an operating system may be stored in the memory 906 and executable by the processor 903. Stored in the memory 956 and executable by the processor 953 are the agent application 131, dialer application 133, messaging application 135, and potentially other applications.

It is understood that there may be other applications that are stored in the memory 906, 956 and are executable by the processor 903, 953 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906, 956 and are executable by the processor 903, 953. In this respect, the term "executable" means a program file that is in a form that can ultimately be run by the processor 903, 953. Examples of executable programs may be, for example, a compiled program that can be translated into machine code in a format that can be loaded into a random access portion of the memory 906, 956 and run by the processor 903, 953, source code that may be expressed in proper format such as object code that is capable of being loaded into a random access portion of the memory 906, 956 and executed by the processor 903, 953, or source code that may be interpreted by another executable program to generate instructions in a random access portion of the memory 906, 956 to be executed by the processor 903, 953, etc. An executable program may be stored in any portion or component of the memory 906, 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906, 956 is defined herein as including both volatile and nonvolatile memory and data storage components. Volatile components are those that do not retain data values upon loss of power. Nonvolatile components are those that retain data upon a loss of power. Thus, the memory 906, 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903, 953 may represent multiple processors 903, 953 and/or multiple processor cores and the memory 906, 956 may represent multiple memories 906, 956 that operate in parallel processing circuits, respectively. In such a case, the local interface 909, 509 may be an appropriate network that facilitates communication between any two of the multiple processors 903, 953, between any processor 903, 953 and any of the memories 906, 956, or between any two of the memories 906, 956, etc. The local interface 909, 509 may comprise additional systems designed to coordinate this communication, including, for example, performing load balancing. The processor 903, 953 may be of electrical or of some other available construction.

The client device 106 may include a display 952 that comprises, for example, one or more devices such as liquid crystal display (LCD) displays, gas plasma-based flat panel displays, organic light emitting diode (OLED) displays, LCD projectors, or other types of display devices, etc. The client device 106 may also include one or more input/output devices 515 that may include, for example, a capacitive touchscreen or other type of touch input device, fingerprint reader, keyboard, etc. Additionally, the client device 106 may also include some form of mass storage 958, which can comprise a hard drive, flash memory, or other storage devices.

Although the agent application 131, dialer application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows an example of the functionality and operation of an implementation of portions of the dialer application 133 and/or messaging application 135. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dialer application 133, that comprises software or code can be embodied in any non-transitory computer-readable medium for use by or in connection with an instruction execution system such as, for example, a processor 903, 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the dialer application 133, messaging application 135, etc., may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900 and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable in a client device, the instructions, when executed by the client device, causing the client device to at least:

execute an agent application that instructs the client device to communicate with a server for accessing resources of an enterprise, wherein the server manages functionality of multiple client devices assigned to users of the enterprise;

render a dialer user interface on a display controlled by the client device;

identify, by the agent application, a location of the client device and a network to which the client device is connected;

obtain a request to initiate a call to a contact identifier via the dialer user interface;

determine, by the agent application, whether a compliance rule requires a redirect prompt to be presented on the dialer user interface based on the location of the client device and the network to which the client device is connected, wherein the compliance rule is obtained by the agent application from the server based on a first profile assigned to the client device;

identify a computing device separate from the client device; and display the redirect prompt on the client device, the redirect prompt requesting an indication from a user of the client device to redirect the call from the client device to the identified computing device.

2. The non-transitory computer-readable medium of claim 1, further comprising, in response to receiving the indication, redirecting the call to the identified computing device.

3. The non-transitory computer-readable medium of claim 1, wherein the request for the indication comprises a request for the user to enter at least one of a password, a personal identification number, or a billing identifier.

4. The non-transitory computer-readable medium of claim 1, wherein the request for the indication comprises a request for the user to solve at least one of a puzzle or a Completely Automated Public Turing test to tell Computers and Humans Apart (CAPTCHA).

5. The non-transitory computer-readable medium of claim 1, wherein the request for the indication comprises a request for the user to authenticate by at least one of: a biometric authentication, scanning of a barcode identifier, submitting a particular user input sequence or submitting an authentication determined by another device.

6. The non-transitory, computer-readable medium of claim 1, wherein the client device further executes the agent application that communicates with the server, and wherein the agent application displays the redirect prompt in accordance with the compliance rule.

7. The non-transitory, computer-readable medium of claim 1, wherein the compliance rule is defined for the first profile by an administrator in a console at the server.

8. The non-transitory, computer-readable medium of claim 1, wherein the client device provides the user with access to different applications in business mode than when the client device is in personal mode.

9. A system, comprising:
a non-transitory, computer-readable medium containing instructions;
a processor that executes the instructions to perform stages including:
sending an agent application to a client device, the agent application causing the client device to communicate with a server to access resources of an enterprise, wherein the server manages functionality of multiple client devices assigned to users of the enterprise, wherein the agent application instructs the client device to perform steps including:
obtaining a request to initiate a call to a contact identifier from a dialer application executing on the client device;
identifying a location of the client device and a network to which the client device is connected;
determining whether a compliance rule requires a redirect prompt to be presented on the client device based on the location of the client device and the network to which the client device is connected, wherein the compliance rule is received from the server by the agent application based on a first profile assigned to the client device;
identifying a computing device separate from the client device; and
displaying the redirect prompt on the client device, the redirect prompt requesting an indication from a user of the client device to redirect the call from the client device to the identified computing device.

10. The system of claim 9, wherein the client device further executes the agent application, wherein the agent application identifies the computing device and displays the redirect prompt.

11. The system of claim 9, wherein the compliance rule is defined for the first profile by an administrator in a console at the server.

12. The system of claim 9, wherein the client device provides the user with access to different applications in a business mode than when the client device is in a personal mode.

13. A method, comprising:
executing an agent application on a client device to access resources of an enterprise from a server, the server managing functionality of multiple client devices assigned to users of the enterprise;
rendering, on a display device controlled by a client device, a user interface facilitating initiation of communication with a contact identifier;
obtaining, by the client device, a request to initiate communication with a particular contact identifier with a dialer application;
identifying, by the agent application on the client device, a compliance rule that applies to the request to initiate communication, wherein the compliance rule is received from a server based on a first profile assigned to the client device and requires a redirect prompt to be presented on the user interface based on a location of the client device and a network to which the client device is connected;
identifying a computing device separate from the client device; and
displaying the redirect prompt on the client device, the redirect prompt requesting an indication from a user of the client device to redirect the call from the client device to the identified computing device.

14. The method of claim 13, further comprising, in response to receiving the indication, redirecting the call to the identified computing device.

15. The method of claim 13, wherein the redirect prompt requests user input in order to initiate the requested communication.

16. The method of claim 13, wherein the agent application identifies the computing device and displays the redirect prompt.

17. The method of claim 13, wherein the compliance rule is defined for the first profile by an administrator in a console at the server.

18. The method of claim 13, wherein the client device provides the user with access to different applications in a business mode than when the client device is in a personal mode.

* * * * *